United States Patent [19]

Raebiger

[11] 3,745,765

[45] July 17, 1973

[54] DEVICE FOR VENTILATING HYDROSTATIC MOTION CONVERTERS IN FREE-FLOATING PISTON ENGINES

[75] Inventor: Wolfgang Raebiger, Buckenhofen, Germany

[73] Assignee: Grundig, Furth/Bay, Germany

[22] Filed: Dec. 8, 1971

[21] Appl. No.: 205,886

[30] Foreign Application Priority Data
Feb. 11, 1971 Germany.................. P 21 06 405.1

[52] U.S. Cl. .................................................. 60/24
[51] Int. Cl. ............................................ F03g 7/06
[58] Field of Search............................ 60/24, 12, 19

[56] References Cited
UNITED STATES PATENTS

| | | | |
|---|---|---|---|
| 2,230,760 | 2/1941 | Pescara............................. | 60/19 X |
| 3,066,476 | 12/1962 | Conrad.................................. | 60/19 |
| 3,135,094 | 6/1964 | Kress.................................. | 60/19 X |
| 3,335,640 | 8/1967 | Conrad............................... | 60/19 X |
| 3,604,204 | 9/1971 | Conrad.................................. | 60/19 |

FOREIGN PATENTS OR APPLICATIONS

| | | | |
|---|---|---|---|
| 1,157,876 | 11/1963 | Germany............................... | 60/19 |

*Primary Examiner*—Martin P. Schwadron
*Assistant Examiner*—H. Burks, Sr.
*Attorney*—Lewis H. Eslinger et al.

[57] ABSTRACT

A device for ventilating the hydrostatic motion converters of free-floating piston engines is provided wherein two countercurrent driving pistons are enclosed in each engine cylinder to define joint combustion chambers and drive independent hydrostatic motion converters. The device includes means for detecting the momentary or instantaneous position of each of the pistons in the cylinder and producing output signals representative of those positions. The momentary or instantaneous angular position of the engine output shaft is detected by an independent detector which produces an output signal representative of that position. Individual comparing means receive the output signals from the shaft detecting means and the respective piston detecting means and compare these output signals to produce individual synchronization error signals for each cylinder, which signals are representative of the synchronization error between the instantaneous locations of the pistons in that cylinder and the instantaneous angular location of the shaft. Liquid control means responsive to the synchronization error signals vary the quantity of liquid in the hydrostatic motion converters between the cylinders and the output shaft to reduce the synchronization error. Means are also provided for supplying a constant interference signal, representative of a loss of liquid in the hydrostatic converter, to the liquid control means of one of the pistons, in lieu of the signal from one of the comparing means associated with that piston, while the other of the piston detecting means is in normal operation, so that gases in the hydrostatic system escape therefrom through the liquid varying means associated with the other of the pistons.

10 Claims, 2 Drawing Figures

United States Patent [19]
Raebiger
[11] 3,745,765
[45] July 17, 1973
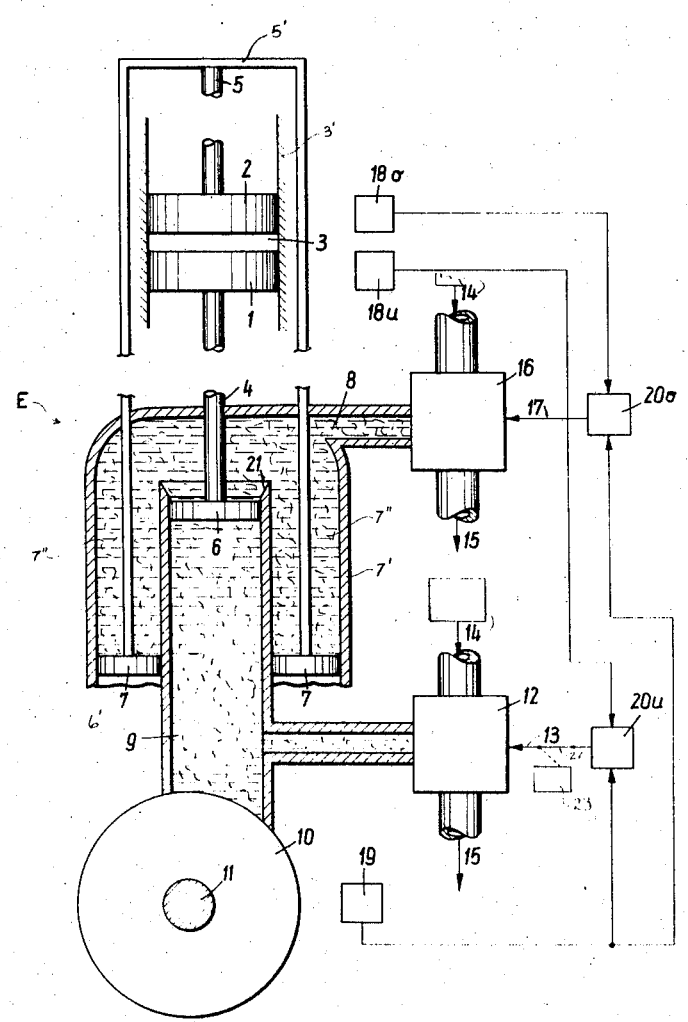

DEVICE FOR VENTILATING HYDROSTATIC MOTION CONVERTERS IN FREE-FLOATING PISTON ENGINES

The present invention relates to a device for venting hydrostatic motion converters and in particular to a device for venting hydrostatic motion converters by an automatic operation.

Hydrostatic motion converters, as are used for power transmission between driving pistons and a driven shaft, normally are used with free-floating piston engines in which each cylinder has two countercurrent driving pistons defining a joint combustion chamber therebetween. The position of each piston is controlled by piston detectors which detect the momentary, or instantaneous, position of each piston and produce an output signal representative thereof and a shaft detector which detects the instantaneous angular position of the driven shaft and produces a separate output signal representative thereof. These electrical output signals are conducted to signal comparators which compare the signals and produce a synchronization error signal that is utilized to control the quantity of pressure liquid in the hydrostatic system so as to reduce the snychronization error and maintain the pistons and shaft in proper synchronization.

Generally, when an engine of this type has been standing idle for a prolonged period of time, so that the synchronization control system is switched off for that same period, the liquid in the hydrostatic system escapes through unavoidable leaks in the hydrostatic motion converter. When the system is filled with pressurized liquid before the next start of the engine, large gas bubbles often form in the liquid columns of the converter and must be eliminated before the engine can operate properly. It has previously been proposed to eliminate these gas bubbles by the use of valves installed in appropriate places on the liquid columns of the hydrostatic converter. These valves must be opened manually and when thus opened, a mixture of pressurized liquid and gas escapes through them for as long as it takes for the liquid within the hydrostatic system to become free of bubbles.

Gas venting processes of the above type are extremely time consuming and complicated since they must be performed separately for the upper and lower pistons of each cylinder. Typically, this process takes about 20 minutes per cylinder and requires the presence of an attendent who must move around the relatively large engine to open and close the separate valves in a proper sequence. Accordingly, the free-floating piston engines with hydrostatic motion converters have serious drawbacks when compared to conventional combustion engines having combustion rods and crankshafts.

Thus, it is an object of the present invention to vent gases from a free-floating piston engine in an automatic process which avoids the drawbacks of previously proposed arrangements.

Yet another object of the present invention is to reduce the amount of time required to vent hydrostatic systems.

Still another object of the invention is to vent hydrostatic systems by a remotely controlled arrangement.

In accordance with an aspect of the present invention, venting of the hydrostatic systems in engines of the above type is accomplished by normally maintaining the piston detector of the upper piston in each cylinder in operation in conjunction with the shaft detector so that a synchronization error signal is produced for that piston and liquid is supplied or removed from its associated liquid column in accordance with the error signal. The liquid control means associated with the lower of the two pistons is disconnected from its associated comparing means and connected to a signal generator which produces a constant interference signal that is supplied to the comparing means for the lower piston. The interference signal selected simulates a pressure loss so that the liquid control for the liquid column associated with the lower piston supplies liquid under pressure to that column whereby the lower piston is raised to its uppermost position in the cylinder. That piston is operatively connected to a driven piston which reciprocates in a cylinder or tube defining the liquid column associated with the lower piston, which column has a flared generally conical upwardly opening top edge portion. The driven piston, when the constant interference signal is on, is raised to a position adjacent the edge of the cylinder, so that liquid under pressure and gas bubbles in the surrounding tube can pass between the edges of the driven piston and the conical side walls of the top edge of the tube into the liquid column or columns associated with the upper piston. The increased fluid and gas thus supplied to these latter columns tends to cause the upper cylinder to move downwardly, however this increases the synchronization error signal produced by the detector means associaed with the upper piston so that the liquid control means associated therewith causes liquid in those chambers to be discharged from the system. If this discharge is provided at the highest point in the system, the gases contained in the liquid, which will rise to the top surface thereof, will escape first from the system so that little or no liquid is actually lost.

The above, and other objects, features and advantages of this invention will be apparent in the following detailed description of an illustrative embodiment thereof which is to be read in connection with the accompanying drawings, wherein.

Figure 1:
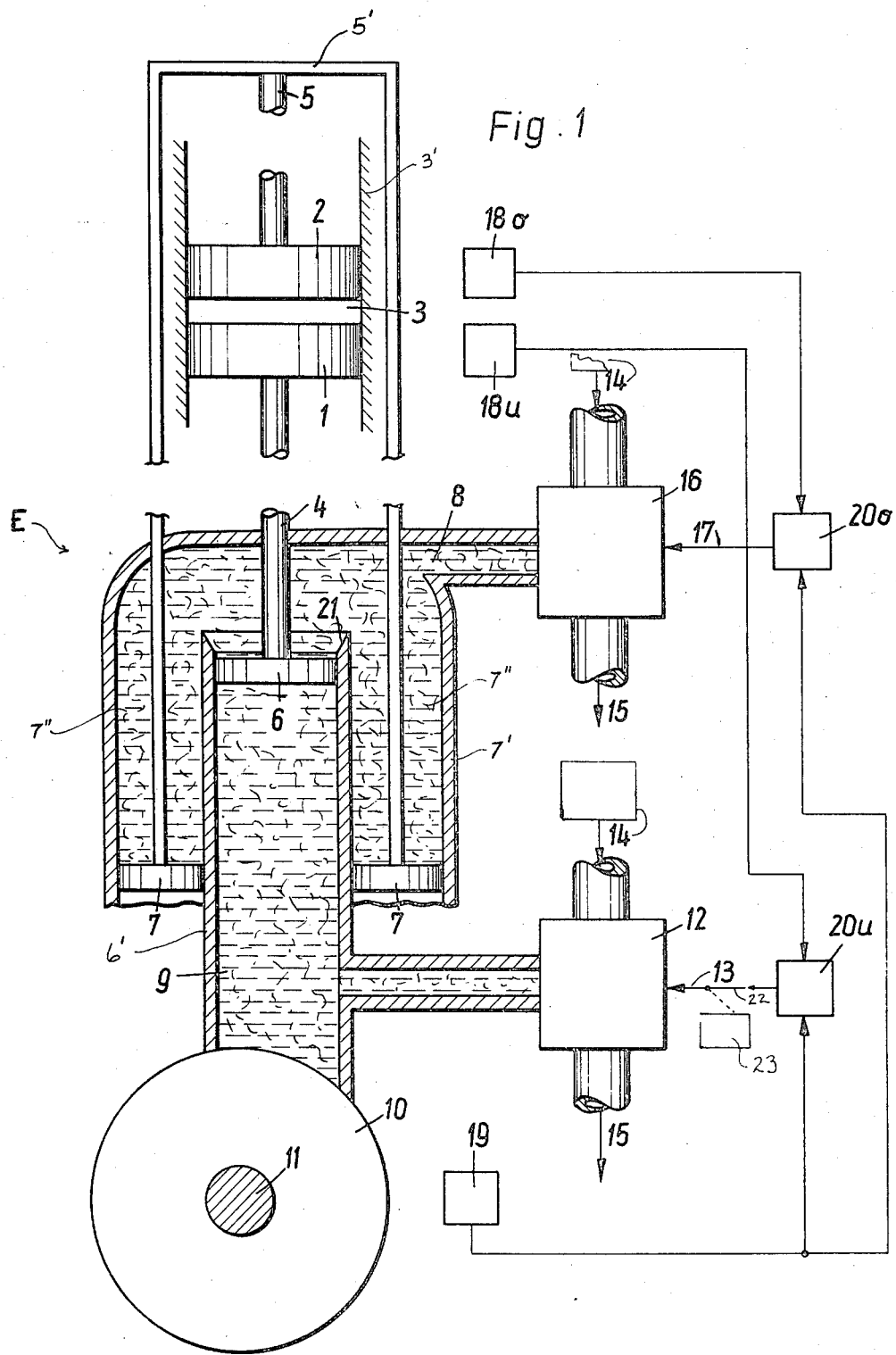
FIG. 1 is a schematic view, partly in section, of a free-floating piston engine having a hydrostatic motion converter controlled in accordance with the present invention.

Referring now to the drawings in detail, and initially to FIG. 1, it will be seen that a free-floating piston engine E which is adapted to be controlled in accordance with the present invention includes a lower piston 1 and an upper piston 2 which cooperate to define a joint combustion chamber 3 contained within the cylinder 3' of the engine. Piston 1 is connected by a rod 4 to a lifting or driven piston 6 contained within a cylindrical column or tube 6', and piston 2 is rigidly connected through a rod 5 and a U-shaped brace 5' to the lifting pistons 7 of the hydrostatic motion converter. Pistons 7 are contained within a housing 7' providing a pair of cylindrical liquid columns 7''. The effective diameter of pistons 7 is about one-half the size of the effective diameter of lifting piston 6.

In operation, the force exerted by upper piston 2 is transmitted through rod 5, brace 5' and lifting pistons 7 to the liquid 8 under pressure within columns 7'' and thus to the top side of the lifting piston 6 where it is combined with the force applied by piston 1 and rod 4 to piston 6 to form the total force that is transmitted to the pressure liquid in cylinder 6'. That force is transmitted through the pressurized liquid 9 in cylinder 6' to the rotary converter 10 and thus to the drive shaft 11 in the well known manner. The length of liquid column 9 is controlled by a slide or valve 12 which, under the influence of a signal coming from the lead 13, either feeds liquid under pressure from a source 14 thereof into the cylinder 6 or draws liquid from the cylinder and discharges it therefrom in the direction of arrow 15. Similarly, the length of the liquid columns 7'' above lifting piston 7 is controlled by a slide or valve 16 which is operated in response to signals applied thereto through the control lead 17. These slides or valves 12, 16, may be of the solenoid type or the like as would be obvious to artisans in this field.

Control leads 13, 17, each supply a synchronization error to the control valves 12, 16 which signals are produced in signal comparators $20_o$, $20_u$ of conventional construction, for upper piston 2 and lower piston 1 respectively. In order to produce these synchronization error signals, engine E is provided with signal generators or piston detectors $18_u$, $18_o$ respectively. These signals generators are also of conventional construction and may be, for example, electromagnetic pickup devices. In any case, the generators produce signals which respectively represent the instantaneous position of the pistons 1 and 2 at any given instant or moment of time during the operation of the engine. In addition, another signal generator, or a shaft detector 19, is located adjacent the engine output shaft 11 in order to detect the instantaneous angular position of the shaft for comparison with the instantaneous position of the pistons 1 and 2. The signal from detector 19 is supplied to comparators $20_u$ and $20_o$ along with the signals from the detectors $18_u$ and $18_o$ respectively, as is indicated in the circuit diagram of FIG. 1. The signals emitted from detector $18_u$ is compared in comparator $20_u$ with the signal from detector 19 and the signal produced in detector $18_o$ is compared in comparator $20_o$ with the signal produced by detector 19 to provide simultaneous synchronization error signals in lines 13, 17 to control valves 12 and 16 respectively. In this manner, the length of the liquid column 9 in cylinder 6', and the length of liquid columns 7'' are controlled so that the pistons 1 and 2 are maintained in synchronization with the rotation of shaft 11. At all times comparators $20_u$ and $20_o$ are working to reduce the synchronization error signals which they produce so as to maintain the pistons in synchronization.

When it is desired to vent engine E, in accordance with the invention, detector $18_o$, for upper piston 2, is maintained in operation so that comparator $20_o$ and valve 16 attempt to keep the piston in synchronization with the shaft 11. However, simultaneously, comparator $20_u$ is disconnected from control slide 12 by a switch 22 in line 13 and is connected by the switch to an interference signal generator 23. The signal produced by generator 23 is selected to correspond to a constant synchronization error signal from comparator $20_u$ indicating that there is a lack of liquid in cylinder 6' so that valve 12 is operated thereby to supply additional liquid to the cylinder from source 14. As a result, the driven or lifting piston 6 and thus piston 1, are raised to their uppermost positions, i.e., a position, illustrated in FIG. 1, which is past the normal extreme reciprocating position of the cylinder, with the driven piston 6 adjacent the top edge 21 of cylinder 6'.

Edge 21 is generally conically shaped and opens upwardly so that any gases contained in liquid column 9 can escape from cylinder 6' between the sides of piston 6 and the conical end 21 of the cylinder. As mentioned above, bubbles of gas may be formed within cylinder 6' when engine E is not in operation, due to leakage of liquid from the engine. Therefore, it is necessary to remove these gases before starting or continuing operation of the engine for an extended period of time.

The gas bubbles escaping from cylinder 6' enter housing 7' and rise to the top of the housing along with any other gas bubbles contained within housing 7' as a result of leakage therein. Since liquid is continually being supplied to cylinder 6' through valve 12, some pressurized liquid also escapes from cylinder 6' from between lifting piston 6 and edge 21 and as a result, additional liquid is supplied to housing 7' so that there is a downward force applied to the lifting piston 7. This force tends to cause downward movement of piston 2 which is detected by detector $18_o$. Accordingly, the latter produces an output signal which is out of synchronization with the signal produced by shaft detector 19 so that comparator $20_o$ produces a synchronization error signal in line 17, which signal is indicative of the fact that there is excess pressurized liquid in housing 7', so that valve 16 is opened to relieve that pressure in the direction of arrow 15. As a result, excess liquid plus the gas in the housing are evacuated from the housing 7'. In the preferred embodiment of the invention, valve 16 is located at the uppermost portion of the housing 7' so that gas bubbles formed at the top of the housing will immediately escape from the housing and be discharged therefrom so that the evacuating or venting process is relatively rapid.

Figure 2:
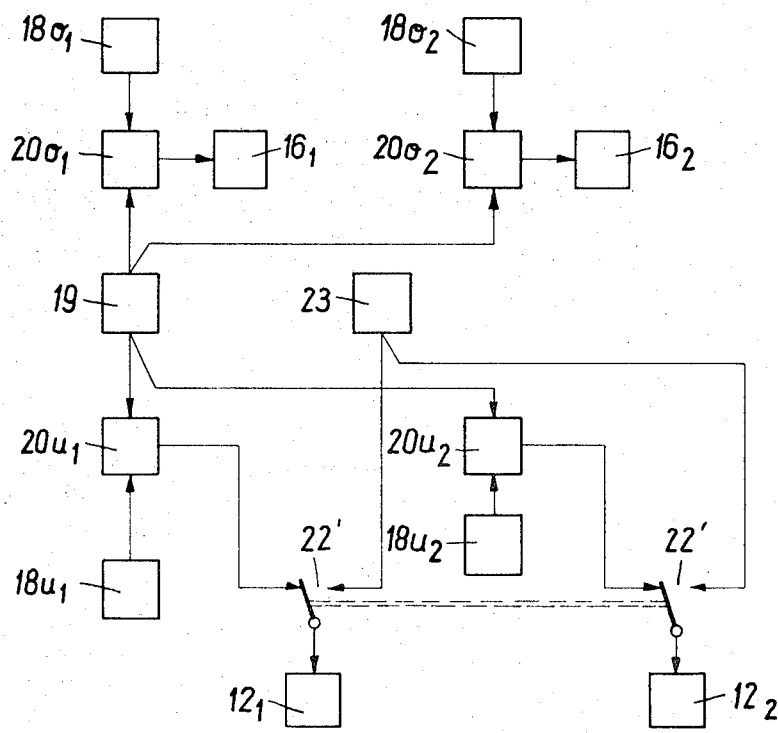
FIG. 2 is a schematic block diagram of circuitry utilized to control an engine similar to FIG. 1 having a plurality of cylinders therein.

It is thus seen that by the arrangement of the present invention it is no longer necessary to vent the systems of the separate cylinders one after another in a manual manner as has heretofore been provided. In fact, in accordance with one embodiment of the invention, the systems of all cylinders can be vented jointly and simultaneously. This arrangement is illustrated in FIG. 2 of the drawings which shows a schematic arrangement for a two cylinder free-floating piston engine of the kind described above, wherein the subscripts 1 and 2 refer to the two cylinders, and the letters o and u refer to the upper and lower pistons therein respectively. The numbers referred to are otherwise identical with those in FIG. 1. As seen therein, a two pole switch 22' connects, for venting purposes, the control slides or valves $12_1$ and $12_2$ for the hydrostatic system of the lower pistons in the two cylinders to the signal generator 23 which supplies the interference signal simulating a pressure loss in cylinder 6' to trigger the venting of both cylinders simultaneously, in the manner described above.

Accordingly, it is seen that a relatively simple and inexpensive apparatus is provided for venting free-floating hydrostatic motion converters, which is relatively automatic in operation and simple in use. Moreover, the operation is relatively rapid and there is no manual turning or opening of valves as heretofore has been necessary, so that substantial savings in time and costs in venting the systems are achieved.

Although illustrative embodiments of the present invention have been described herein with reference to the accompanying drawings, it is to be understood that the invention is not limited to those precise embodiments and that various changes and modifications may be effected therein by one skilled in the art without departing from the scope or spirit of this invention.

What is claimed is:

1. A device for ventillating the hydrostatic motion converters of free-floating piston engines having an output shaft and at least one pair of countercurrent driving pistons enclosed in a single combustion cylinder to define a joint combustion chamber, said driving pistons driving independent but cooperating columns of liquid in the engine's hydrostatic motion converters, said columns being separated by a driven piston operatively connected to one of the pistons in said combustion cylinder for reciprocation thereby, and said driven piston being located in a cylinder member in said hydrostatic motion converters which cylinder member defines one of said columns of liquid and has an open top for providing communication between said columns of liquid when said driven piston is located at a predetermined position, past one of its normal extreme positions, adjacent said open top, said device including independent piston detector means associated with each of the driving pistons in said combustion cylinder for producing output signals corresponding to the momentary position of the driving pistons, shaft detector means for producing an output signal corresponding to the instantaneous angular position of the engine output shaft, means associated with each of said liquid columns for respectively comparing the output signal of the shaft detector and the output signal from the piston detector associated with the driving piston driving its associated column and for producing synchronization error signals in response to said output signals, liquid control means respectively associated with each of said columns for supplying or removing liquid from said columns in response to said synchronization error signals, thereby to maintain synchronization in the engine, and means for selectively supplying a predetermined constant interference signal to the liquid control means of said one column of liquid in said cylinder member, said constant interference signal being representative of loss of liquid in said one liquid column driven by said one driving piston, whereby said driven piston is moved to said predetermined position, past one of its normal extreme reciprocating positions, thereby causing escape of gas and pressurized liquid from said one column of liquid in said cylinder member to the other liquid column, around said driven piston and discharge thereof to the liquid control means associated with said other liquid column.

2. The device as defined in claim 1 wherein the pistons in said cylinder are positioned for reciprocation in a generally vertical direction with said one piston detector means being associated with the lowermost of said pistons and said liquid control means associated with said other liquid column is at the highest elevation of said column.

3. The device as defined in claim 2 including a plurality of countercurrent driving pistons enclosed in independent cylinders in said engine, with each pair of countercurrent driving pistons having piston detector means, output signal comparing means and liquid control means cooperating with the output signal of said shaft detector to maintain said pistons in synchronization with said output shaft.

4. The device as defined in claim 3 wherein said means for selectively supplying a predetermined interference signal is adapted to be simultaneously electrically connected to each of the liquid control means of the lowermost of the pistons in said cylinders for simulating a loss of pressure liquid in their associated column and causing their associated liquid control means to supply liquid to those columns.

5. The device as defined in claim 2 wherein said cylindrical member defining the liquid column driven by said one piston has a top edge adjacent the open top thereof, said top edge having an upwardly opening conically shaped edge portion.

6. The device as defined in claim 5 wherein said driven piston is located adjacent the conically shaped top edge portion of said cylindrical member when said driven piston is moved to said predetermined position to permit passage of gas between the sides of said driven piston and the conical edge into said other liquid column.

7. A method for venting the hydrostatic motion converter of free-floating piston engines having an output shaft and at least one pair of countercurrent driving pistons enclosed in a single cylinder to define a joint combustion chamber, and said pistons driving independent but cooperating columns of liquid in the engine's hydrostatic motion converter, said method comprising the step of detecting the instantaneous position of one of said pistons and producing an output signal representative thereof, detecting the instantaneous position of the engine output shaft and producing an output signal representative thereof, comparing said output signals and producing a synchronization error signal in response thereto, utilizing said synchronization error signal to adjust the quantity of liquid in the liquid column associated with said one piston until said one piston and said shaft are in synchronized position, selectively supplying an interference signal to a signal responsive device for controlling the quantity of liquid in the other of said liquid columns, said interference signal being representative of a loss of liquid in said other column whereby the other of said pistons is moved to a position past one of its normal extreme reciprocating positions to permit gas and liquid to escape from said other column to said one column.

8. A device for ventillating the hydrostatic motion converters of free-floating piston engines having an output shaft and at least one pair of cooperating upper and lower countercurrent driving pistons enclosed in a single cylinder to define a joint combustion chamber, said driving pistons driving independent but cooperating columns of liquid in the engine's hydrostatic motion converters, said columns being separated by a driven piston operatively connected to said lower piston for reciprocation thereby, and said driven piston being located in a cylinder member in said hydrostatic motion converters, which cylinder member defines one of said columns of liquid and has an open top for providing communication between said columns of liquid when said driven piston is located at a predetermined position, past one of its normal extreme positions, adjacent said open top; said device including means for controlling the position of said upper and lower pistons comprising piston detector means for continuously producing respective electrical output signals representative of the instantaneous position of each of said upper and lower pistons, shaft detector means for continuously producing an electrical output signal representative of the instantaneous angular position of engine output shaft, means associated with each of said liquid columns for respectively comparing the electrical output signals of said shaft and piston detectors to produce respective synchronization error signals, and liquid control means respectively associated with each of said columns for controlling the amount of liquid in each of said columns in response to said synchronization error signals, said liquid control means for the liquid column associated with said upper driving piston being located at the highest elevation of its associated column; and means for selectively supplying a predetermined constant interference signal, in lieu of said synchronization error signal, to the liquid control means associated with the column of liquid in said cylinder member and associated with said lower driving piston, said constant interference signal being representative of leakage of liquid from said column of liquid in the cylinder member, whereby liquid is supplied to said cylinder member through its associated liquid control means to move said driven piston to said predetermined position and thereby to cause escape of gas and pressurized liquid from the column of liquid in said cylinder member, around said driven piston, into the column of liquid associated with said upper driving piston for discharge through the liquid control means associated therewith.

9. The device as defined in claim 8 wherein said cylindrical member defining the liquid column driven by said one piston has a top edge adjacent the open top thereof, said top edge having an upwardly opening conically shaped edge portion.

10. The device as defined in claim 8 including a plurality of countercurrent driving pistons enclosed in independent combustion cylinders in said engine, with each pair of countercurrent driving pistons having piston detector means, output signal comparing means and liquid control means cooperating with the output signal of said shaft detector means to maintain said pistons in synchronization with said output shaft, said means for selectively supplying a predetermined interference signal being adapted to be simultaneously electrically connected to each of the liquid control means of the lower driving pistons in said combustion cylinders for simulating a loss of pressure liquid in their associated column and causing their associated liquid control means to supply liquid to those columns.

* * * * *